(12) United States Patent
Kapadia et al.

(10) Patent No.: US 10,298,698 B2
(45) Date of Patent: May 21, 2019

(54) ENDPOINT LOCATION TRACKING (71) Applicant: Cisco Technology, Inc., San Jose, CA (US)

(72) Inventors: Shyam Kapadia, San Jose, CA (US); Lukas Krattiger, Pleasanton, CA (US); Wing Hon Yeung, Santa Clara, CA (US); Uffaz Nathaniel, Northampton, PA (US); Richard Lam, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 15/205,031

(22) Filed: Jul. 8, 2016

(65) Prior Publication Data

US 2018/0013654 A1 Jan. 11, 2018

(51) Int. Cl.
*H04L 29/08* (2006.01)
*H04L 12/24* (2006.01)
*H04L 12/46* (2006.01)

(52) U.S. Cl.
CPC .......... *H04L 67/18* (2013.01); *H04L 41/0856* (2013.01); *H04L 41/12* (2013.01); *H04L 12/4641* (2013.01)

(58) Field of Classification Search
CPC ... H04L 43/106; H04L 67/18; H04L 12/4641; H04L 41/12
See application file for complete search history.

(56) References Cited

U.S. PATENT DOCUMENTS

| 7,515,907 | B2 | 4/2009 | Sahim et al. |
| 7,768,929 | B2 | 8/2010 | Karacali-Akyamac et al. |
| 8,358,645 | B2 | 1/2013 | Xu |
| 8,775,580 | B2* | 7/2014 | Cheethirala ........... H04L 49/357 370/389 |
| 2006/0074601 | A1 | 4/2006 | Hoiness et al. |
| 2010/0329149 | A1* | 12/2010 | Singh ...................... H04L 12/28 370/254 |
| 2015/0288635 | A1* | 10/2015 | Hamburg ............. G06Q 10/107 709/206 |
| 2016/0134526 | A1 | 5/2016 | Maino et al. |
| 2018/0205645 | A1* | 7/2018 | Bays ....................... H04L 45/42 |

OTHER PUBLICATIONS

Microsoft, "Network Controller", Apr. 27, 2016, 4 Pages.*

* cited by examiner

*Primary Examiner* — Arvin Eskandarnia
*Assistant Examiner* — Chhian (Amy) Ling
(74) *Attorney, Agent, or Firm* — Edell, Shapiro, & Finnan, LLC (57) ABSTRACT

Presented herein are techniques for actively monitoring, at a network controller, a network location of an endpoint connected to the network based on control plane updates. The network controller is configured to archive the network location of the endpoint, along with local information for the endpoint, in an endpoint tracking database of the network controller.

20 Claims, 7 Drawing Sheets

FIG.1

| DATE | TIME | MAC | IP | VLAN | L2VNI | SVI | L3VNI | IF | TOR | SEQ |
|---|---|---|---|---|---|---|---|---|---|---|
| 04/01/2016 | 09:34:12.43 | 90e2.ba0a.af98 | 4.4.4.103 | 10 | 30002 | 10 | 50000 | ETH 1/25 | LEAF1 | 0 |
| 04/01/2016 | 11:20:55.05 | 0010.18a2.1158 | 4.4.4.101 | 10 | 30002 | 10 | 50000 | ETH 2/47 | LEAF2 | 0 |

ENDPOINT LOCATION TRACKING

TECHNICAL FIELD

The present disclosure relates to tracking the location of endpoint devices in a data center environment.

BACKGROUND

A network host, also referred to herein as a "network endpoint" or simply "endpoint," is a physical or virtual device connected to a computer network. An endpoint may offer, for example, informational resources, services, applications, etc. to users or other nodes connected to the network. In general, an endpoint is a node that is assigned a unique network address (e.g., Media Access Control (MAC) address and/or Internet Protocol (IP) address).

The use of virtual endpoints (e.g., virtual machines and containers) has become increasingly popular with network administrators. In general, virtual endpoints have the ability to migrate/move over time such that memory, storage, processing, network connectivity, etc. of the virtual endpoint are all transferred from one physical server to another physical server. In certain situations, a virtual endpoint may undergo a "live migration" where the virtual endpoint remains up/running during the move from one physical server to another physical server with no impact on availability of the virtual endpoint to users. Alternatively, a virtual endpoint may undergo a "cold migration" where the virtual endpoint is moved from one physical server to another physical server while in a powered-off state.

DESCRIPTION OF EXAMPLE EMBODIMENTS

Overview

Presented herein are techniques for actively monitoring, at a network controller, a network location of an endpoint connected to the network based on control plane updates. The network controller is configured to archive the network location of the endpoint, along with local information for the endpoint, in an endpoint tracking database of the network controller.

Detailed Description

Figure 1:
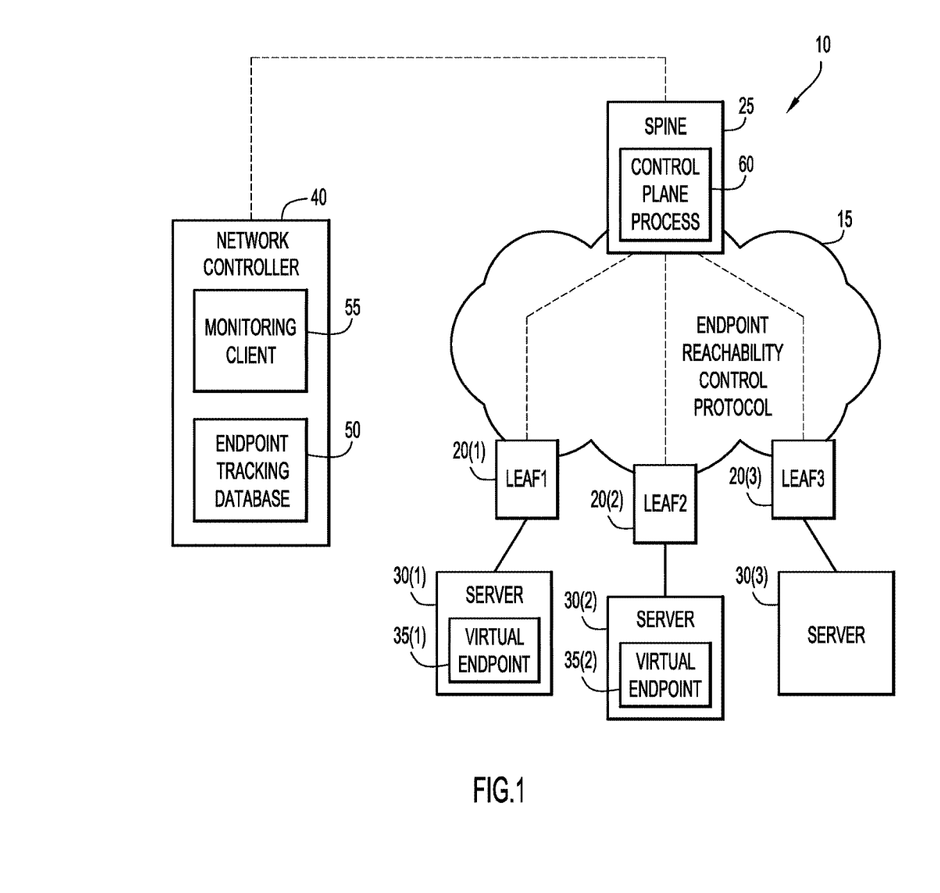
FIG. 1 is a diagram illustrating a data center network environment, according to an example embodiment.

FIG. 1 is schematic diagram illustrating a data center network 10 in which the techniques presented herein may be implemented. The network 10 includes a network fabric 15 to which computing devices 30(1), 30(2), and 30(3) (e.g., servers, computers, etc.) and a network controller 40 are connected (attached). The network fabric is formed by a set of interconnected nodes that, in the example of FIG. 1, have a leaf and spine architecture (e.g., one or more leaf switches and one or more spine switches). For ease of illustration and description, only three leaf switches 20(1), 20(2), and 20(3), and only a single spine switch 25 are shown as part of network fabric 15 in FIG. 1. However, it is to be appreciated that the techniques presented herein may implemented in networks that have different numbers of switches, other networking devices, as well as in networks that have different types of architectures. That is, it is to be appreciated that the leaf and spine architecture of FIG. 1 is merely an example of a network architecture with which the techniques described herein may be implemented.

Also for ease of illustration, FIG. 1 and other examples presented herein are primarily described with reference to specific example endpoint reachability control protocols. In particular, the network fabric 15 may employ the Virtual eXtensible Local Area Network (VXLAN) (developed by Cisco System, Inc.) for data plane encapsulation and Border Gateway Protocol (BGP) with Ethernet Virtual Private Network (EVPN) address-family as the control plane (i.e., for exchanging the endpoint (network host) MAC/IP routes). VXLAN is an overlay technology for network virtualization that provides Layer-2 extension over a Layer-3 underlay infrastructure network by using MAC addresses in Internet Protocol/User Datagram Protocol (IP/UDP) tunneling encapsulation. A VXLAN tunnel end point (VTEP) is a software or hardware component that performs VXLAN encapsulation and decapsulation. The IP address used by a VTEP as the source address for VXLAN encapsulation is called the VTEP address. Certain examples presented herein also make use of a Multiprotocol Border Gateway Protocol Ethernet Virtual Private Network (MP-BGP EVPN), which provides protocol-based VTEP peer discovery and end-host reachability information distribution and a more scalable VXLAN overlay network design suitable for private and public clouds (i.e., a MP-BGP-EVPN control-plane). Such arrangements provide optimal Layer 2 and Layer 3 forwarding of traffic in a high scale multi-tenant data center network environment with an attractive scale out model. Therefore, in the example of FIG. 1, the network fabric 15 may employ a MP-BGP-EVPN control-plane and a VXLAN data-plane (overlay).

Although examples presented herein are generally described with reference to a MP-BGP-EVPN control-plane and a VXLAN data-plane, it is to be appreciated the techniques presented herein may be used with any control-plane and/or data-plane. For example, the techniques presented herein may be used with the Locator/Identifier Separation Protocol (LISP), Provider Backbone Bridging EVPN (PBB-EVPN), or other network technologies leveraging a control-plane that provides selected network attributes.

In FIG. 1, computing devices 30(1), 30(2), and 30(3) are connected to the network fabric 15 via the leaf switches 20(1), 20(2), and 20(3), respectively. In accordance with examples presented herein, computing devices that are attached to the network fabric 15 may be physical endpoints themselves (i.e., a physical device configured to offer, for example, informational resources, services, applications, etc. to users or other nodes connected to the network fabric 15) or may be servers that support one or more virtual endpoints, such as virtual machines (VMs). In the specific example of FIG. 1, computing devices 30(1), 30(2), and 30(3) are servers and computing devices 30(1) and 30(2) each host a virtual endpoint, shown as virtual endpoints 35(1) and 35(2), respectively. As such, in the arrangement of FIG. 1, the endpoints 35(1) and 35(2) each have a "network location" of leaf switch 20(1) and leaf switch 20(2), respectively.

Identification of the network location of an endpoint (network host) within a network, either in real-time or over an extended period, is a generic problem for networks. This problem has become even more of an issue with the introduction of virtual endpoints (e.g., virtual machines and containers) that can migrate/move over time via live or cold migration. In either case, from a network point of view, convergence is important so that the reachability/forwarding information of the endpoint (e.g., Media Access Control (MAC) address and/or Internet Protocol (IP) address) is rapidly updated throughout the network to provide minimal disruption. Reachability information is updated through the network by a control plane, namely through the use of control plane update messages/notifications, referred to herein as control plane updates.

In conventional networks, the network administrator lacks the ability to easily obtain information about the real-time (current or present) network location of an endpoint, and lacks any ability to obtain past/historical network location information relating to an endpoint. The lack of real-time and/or historical network location information may make troubleshooting issues difficult, particularly since the increasing use of live migration, high-availability, and dynamic resource distribution enable an endpoint to change locations suddenly and to be attached to a network at a large number of locations. Accordingly, presented herein are techniques for actively monitoring/tracking the network location of endpoints in a network and archiving the network location along with additional information associated with the endpoint. In one form, the archiving includes the generation of a searchable database that provides the real-time (present) network location of the endpoint as well as historical location information for the endpoint. In general, the network location information for an endpoint, in terms of the state of the endpoint as seen by the network, is maintained and logged/associated with appropriate timestamps (e.g., date and/or time information). The techniques presented herein provide immediate and continuous visibility into the state of endpoints in a network (e.g., programmable fabric) from a network point of view. While it may be possible to continuously poll the Layer-2 and Layer-3 tables of every possible switch within a network to obtain this information, such an approach is inherently impractical and non-scalable. The techniques presented herein, which monitor a control protocol with endpoint reachability information, represent a scalable approach that does not place additional burdens on the switches and/or the remainder of the network.

Referring specifically to the example of FIG. 1, any change in the state of an endpoint (virtual or physical), with respect to how the endpoint is connected to the network fabric 15, will trigger a control plane update (e.g., a BGP EVPN advertisement) that is used to populate updated information for the endpoint across the network fabric 15. More particularly, the endpoint forwarding information such as the IP address, MAC address, Layer-2 segment (i.e., information that identifies the network of the endpoint), Layer-3 Virtual Routing and Forwarding (VRF) information (i.e., information that identifies the tenant to which the endpoint belongs), VTEP IP address (i.e., corresponding to the identity of the switch below which the endpoint is connected), or other information required for forwarding within the fabric are made available in the BGP EVPN advertisement itself (i.e., a control plane update). In accordance with examples presented herein, the control plane updates are also modified/enhanced to carry "local information" for endpoints (i.e., information relating to the local, physical location of the endpoint). This local endpoint information may include, for example, the physical port at which the endpoint is connected to the network (e.g., a first-hop switch port) and/or the virtual local area network (VLAN) associated with the endpoint. With global 24-bit virtual network identifiers (VNIs), the VLAN is localized to a leaf or even to a port. The control plane updates also indicate the switch via which an endpoint is connected to the network (i.e., the first-hop switch), which forms the network location of the endpoint. Stated differently, the network location of an endpoint corresponds to the switch that connects the endpoint to the rest of the network fabric.

A control plane update that is modified to include the local endpoint information is referred to herein as an "enhanced control plane update." The enhanced control plane updates may, in certain examples, be generated at the leaf switches 20(1), 20(2), or 20(3) (i.e., at the first hop for the virtual endpoints).

In the example of FIG. 1, the network controller 40 is configured to collect the enhanced control plane updates that are generated/triggered as a result state changes to endpoints, with respect to the network fabric 15. That is, an enhanced control plane update is generated as result of any change in the state of an endpoint, with respect to how the endpoint is connected to the network fabric 15. The network controller 40 is configured to use the information in the enhanced control plane updates to generate entries in an endpoint tracking database 50. The endpoint tracking database 50 is a scalable database of endpoint information that is indexed by elastic search criteria. The endpoint tracking database 50 may be used by a network administrator to obtain both real-time and historical information for endpoints, including location information, where the information may be displayed in a custom defined multi-dimensional view.

In order to collect and store all the available information, the network controller 40 includes a monitoring client 55 that peers with a control plane process 60 that receives and forwards the enhanced control plane updates. For example, in the arrangement of FIG. 1, the monitoring client 55 is a BGP EVPN client that peers with a BGP Route Reflector in the network fabric 15 that typically runs on a spine switch, such as spine switch 25. The BGP Router-Reflector may serve as the control plane process 60 and receives the enhanced control updates that are generated in response to any endpoint state changes, such as new "learn," "move," or "delete" state changes/events affecting how an endpoint is connected to the network, and then forwards the enhanced control updates to the monitoring client 55. The monitoring client 55 is programmed to extract location information from the enhanced control updates. The location information is information relating to the current network location of the corresponding endpoint (i.e., the endpoint that experienced state change triggering the received control plane update), as determined by the network. The monitoring client 55 is also configured to associate timestamp information (e.g., time and date) with the extracted location information, and insert the location information, and associated timestamp information, into an appropriate location in the endpoint tracking database 50.

That is, an endpoint may undergo a number of different state changes, with respect to how it is connected to the network fabric that each results in the generation of an enhanced control plane update. The monitoring client 55 is configured to interpret the enhanced control plane updates so as to identify the endpoint that has undergone a state change, as well as to understand the specifics of the change that has occurred, so as to correctly populate the endpoint tracking database 50. In one form, the initial connection of an endpoint to a network will trigger an initial entry for that specific endpoint (i.e., for a specific MAC and/or IP address) in the endpoint tracking database 50. Subsequent state changes of that endpoint will result in the addition of subsequent entries for that specific endpoint, each of which is associated with the initial entry. A series of entries relating to a single endpoint, each generated in response to different state changes, collectively form a set or collection of entries for that endpoint, where the collection of entries is referred to herein as an "endpoint tracking list." In certain examples, entries in an endpoint tracking list are linked based on a forwarding address assigned to the endpoint that remains unique to the endpoint, regardless of state changes (i.e., a specific MAC and/or IP address assigned to the endpoint).

Figure 2:
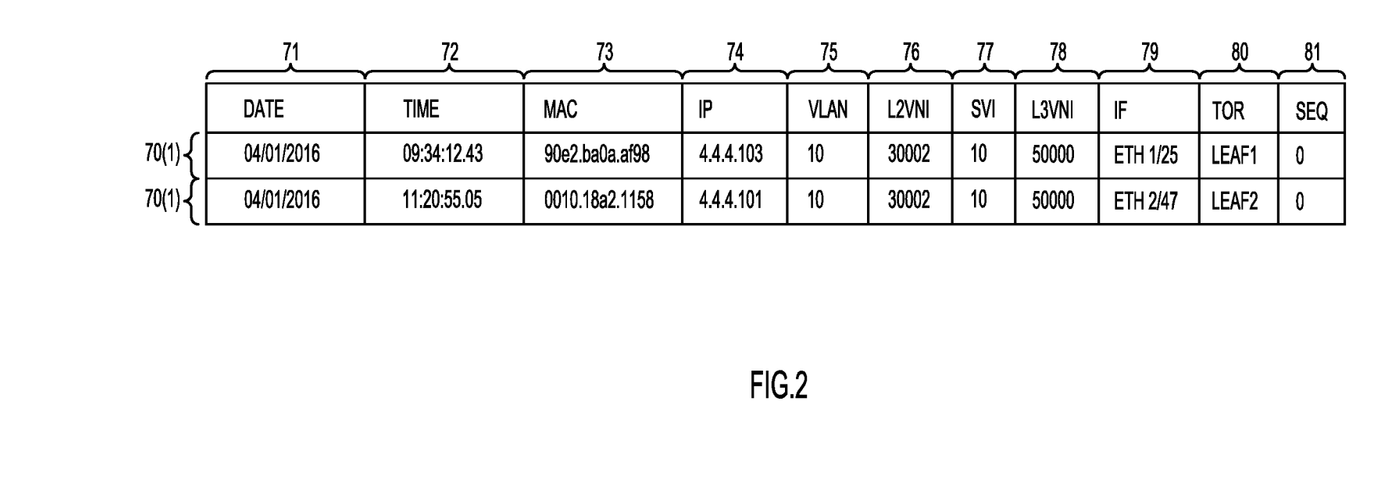
FIG. 2 is a diagram illustrating entries in an endpoint tracking database, according to an example embodiment.

FIG. 2 is a diagram illustrating a portion of the endpoint tracking database 50 with example initial location entries 70(1) and 70(2) for the virtual endpoints 35(1) and 35(2), respectively. In the example of FIG. 2, each location entry 70(1) and 70(2) includes a number of different informational fields, namely a date field 71, a time field 72, a MAC field 73, an IP field 74, a VLAN field 75, an L2 VNI field 76, a switch virtual interface (SVI) field 77, an L3 VNI field 78, an interface/port field 79, a first hop or top-of-rack (TOR) field 80, and a sequence field 81. The date field 71 and the timestamp field 72 store the date and time, respectively, of when an enhanced control plane update (i.e., an endpoint change event) is detected by the monitoring client 55 (i.e., based on a timestamping operation performed at the monitoring client 55). The MAC field 73 and the IP field 74 store the MAC address and IP address, respectively, for the endpoint. The L2 VNI field 76 and the L3 VNI field 78 include the L2 and L3 VNIs, respectively, associated with the endpoint. The SVI field 77 indicates an identifier of the Layer 3 logical interface that is employed for forwarding routed traffic to/from the endpoint. The sequence number field 81 keeps track of the number of times a particular endpoint has moved between different switches since it came up for the first time.

The TOR field 80 identifies the first-hop switch for the endpoint, that is, the switch at which the endpoint is first connected to the network fabric 15. The VLAN field 75 and the interface field 79 correspond to the local information for the endpoint. In particular, the VLAN field 75 identifies the VLAN associated with the endpoint and the interface field 79 identifies the physical port at which the endpoint is connected to the network (e.g., a first-hop switch port).

An endpoint tracking list, and more generally the endpoint tracking database 50, can be used to determine real-time, as well as historical, location information for endpoints at different granularity over the life of the network fabric 15. That is, the endpoint tracking database 50 can be used to provide an efficient real-time search mechanism for endpoints based on various attributes (e.g., MAC, IP, L2 VNI, L3 VNI, first-hop switch, etc.). Since the information is structured and archived, various pieces of useful information are rapidly accessible to network administrators or other users. Examples of this structured data include: (1) lifetime history of an endpoint since it was first attached to the network, (2) the move history of an endpoint, (3) heat-map for endpoints per switch, tenant, network etc. at various time-scales, among other information.

The availability of both the real-time and historical network location information for endpoints improves management of the network 10. That is, the techniques presented herein enable the network controller to automatically monitor both the real-time and historical network location information for endpoints and to automatically initiate one or more remedial actions to proactively adjust a configuration of the network based on the real-time and/or historical network location information in an endpoint tracking database. For example, if an endpoint is determined to appear in an impermissible location, then the controller can proactively disable (i.e., blacklist) the endpoint and initiate one or more remedial actions (e.g., migrate the endpoint to a permissible location). In addition, multiple endpoints may show up at different locations with the same IP and/or MAC address within the same network, often as a result of a misconfiguration on either the host or network side. Using the techniques presented herein, such a result can be detected immediately so that the endpoints can be proactively disabled by the controller and the network administrator can be informed for further action. In a further example, if the number of endpoints that appear below a given switch or port increases beyond a certain threshold, the network controller can initiate an automated remedial action based, for example, on a user-defined policy without any human intervention.

Figure 3A:
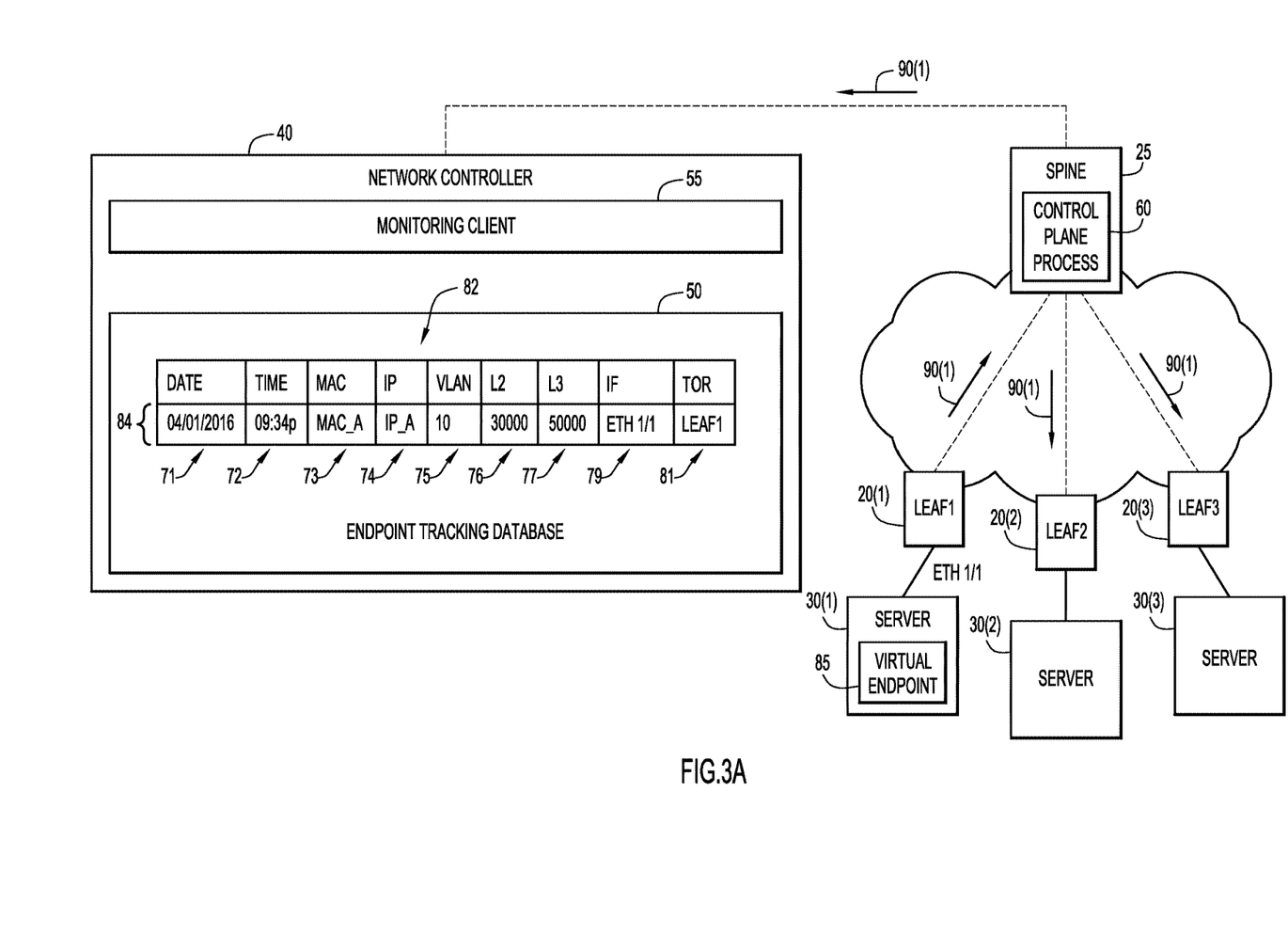
FIGS. 3A-3C are a series of diagrams illustrating the generation of an endpoint tracking list, according to an example embodiment.
Figure 3B:
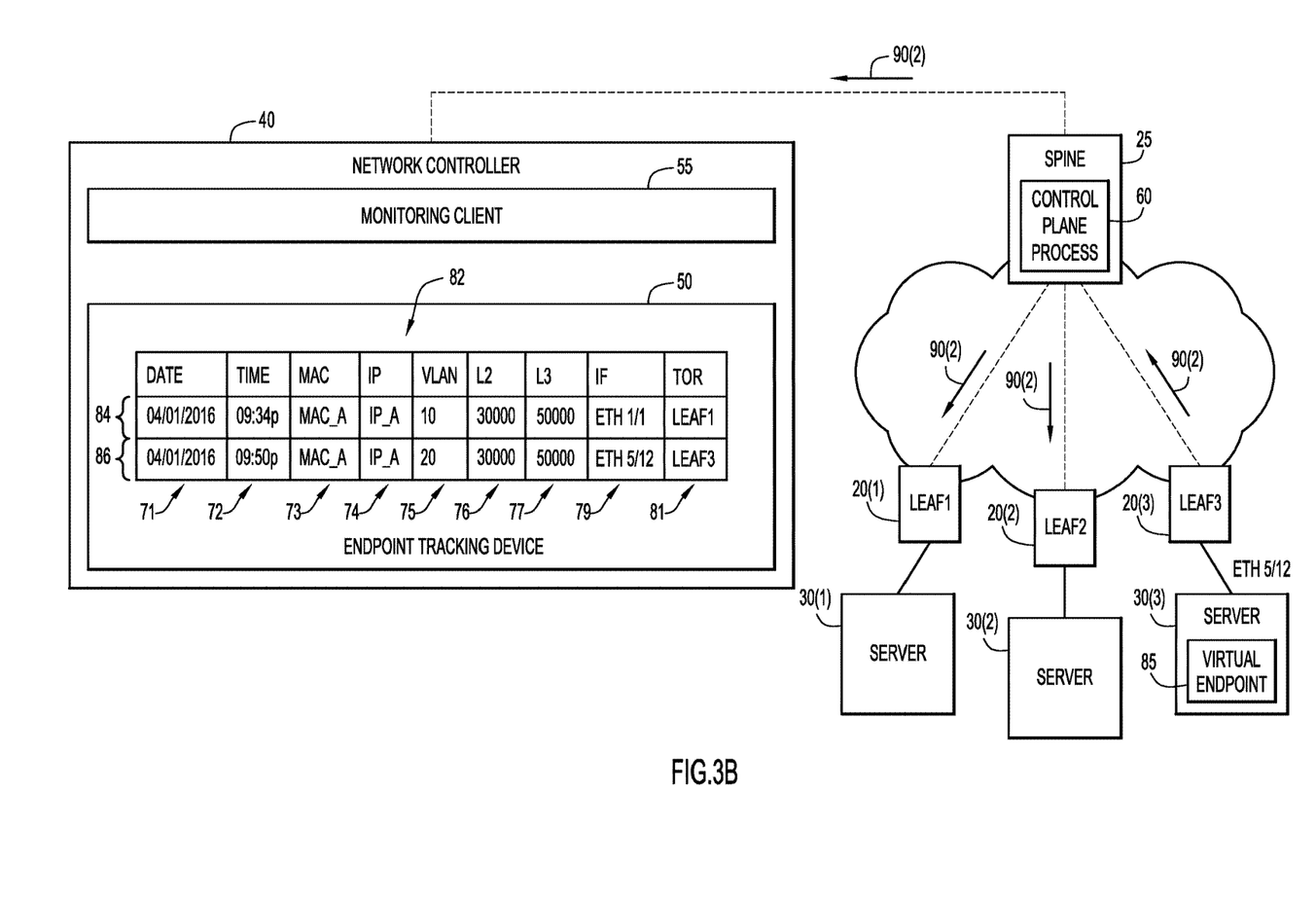
Figure 3C:
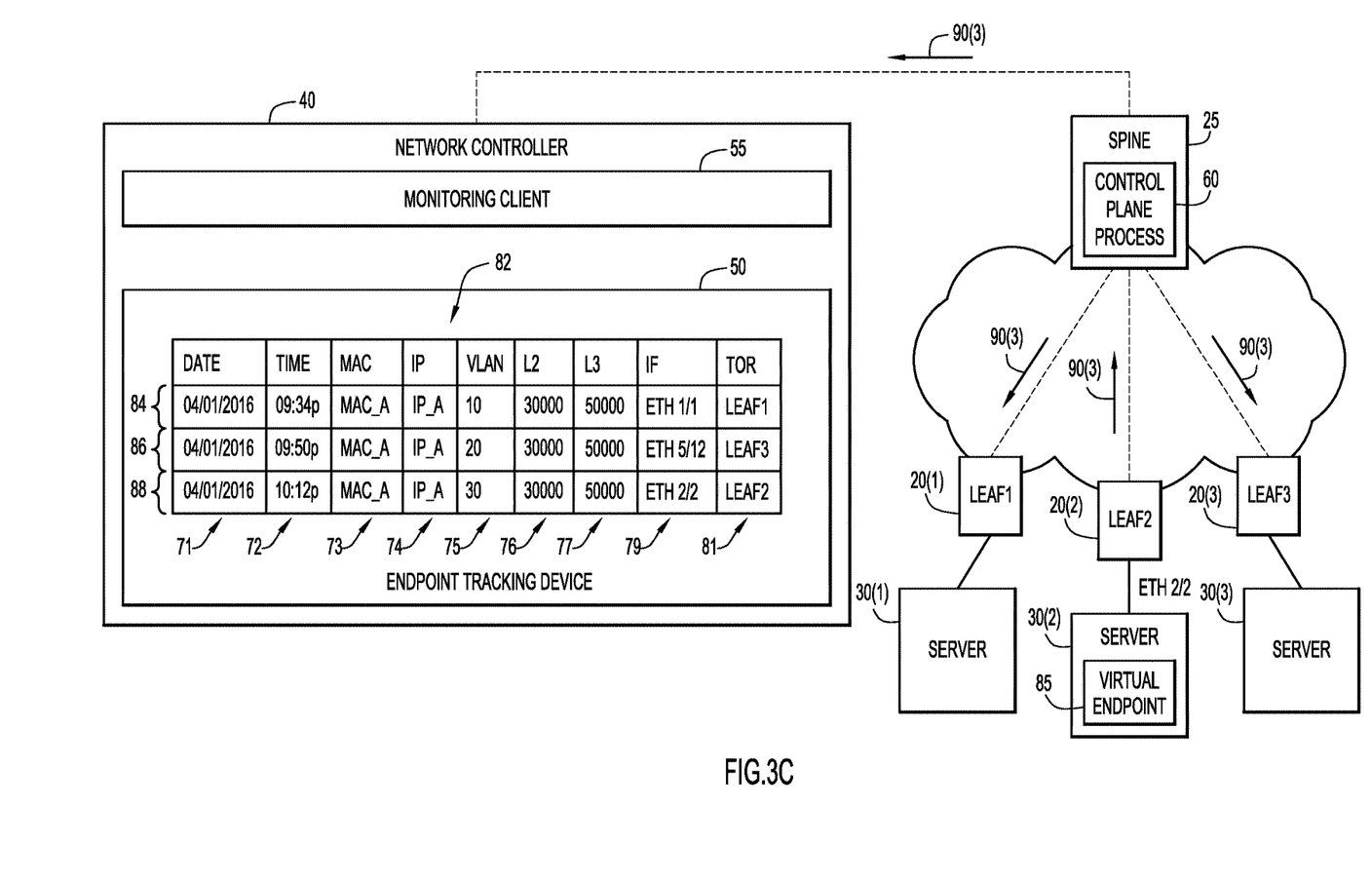

Referenced is now made to FIGS. 3A-3C. FIGS. 3A-3C are a series of schematic diagrams illustrating the generation of an endpoint tracking list (i.e., a portion of endpoint tracking database) for an endpoint attached to a network fabric 15 in accordance with examples presented herein. For ease of description, FIGS. 3A-3C provide a simplified view in which only a single virtual endpoint 85 is present.

Referring first to FIG. 3A, virtual endpoint 85 is initiated at server 30(1) and, as such, is connected to the network fabric 15 via leaf switch 20(1). The initial connection of virtual endpoint 85 to the network fabric 15 via switch 20(1) represents a state change for the endpoint, with respect to the network fabric 15 (i.e., a new learn event at switch 20(1) due to a change in its subnet). In response to this state change, leaf switch 20(1) generates an enhanced control plane update, which is represented in FIG. 3A by arrows 90(1). As shown, the enhanced control plane update 90(1) is sent to the spine switch 25 and to the other leaf switches 20(2) and 20(3) so that the network fabric has forwarding information for the virtual endpoint 85. Also as shown in FIG. 3A, the control plane process 60, (e.g., the Route Reflector (RR)), also forwards the enhanced control plane update 90(1) to network controller 40.

The intent of control plane updates within a network is to enable or preserve the reachability of endpoints within a network fabric. As such, control plane updates include information related to forwarding of packets (e.g., IP address, MAC address, etc.), but control plane updates do not include additional local information associated with endpoints. As noted above, in accordance with embodiments presented herein, when generating an enhanced control plane update, a leaf switch adds additional "local information" for the endpoint into the control plane update. That is, the techniques presented herein incorporate endpoint (host) information into a control plane update, such as a BGP EVPN, so that the control plane provides both host information and network information. This is different from existing control plane schemes that provide only network information.

For example, referring specifically to FIG. 3A, the enhanced control plane update 90(1) identifies the location of the endpoint (i.e., identifies the first-hop switch to which the endpoint is connected), a particular port/interface of the first hop switch (i.e., switch 20(1)) on which the endpoint 85 may be reached, information about a VLAN associated with the endpoint 85, and/or other information, as part of an extended community to the control plane update. As such, the monitoring client 55 (e.g., BGP listener) at the network controller 40 can actively monitor/track the local endpoint information and the endpoint information is correlated with network information within the control plane.

As noted above, the network controller 40 includes a monitoring client 55 (e.g., BGP client) that peers with the control plane process 60 in the network fabric so as to receive any information about endpoint state changes, such as new learn, update, delete, etc. events (including VM move related state changes). That is, the monitoring client 55 is configured to collect the enhanced control plane update 90(1), extract the endpoint information included therein, and to store all the available information in the endpoint tracking database 50. Also as noted above, the monitoring client 55 is configured to understand the enhanced control plane update 90(1) (e.g., EVPN advertisement) and operates to associate timestamp information with the information extracted from the enhanced control plane update 90(1). The information extracted from the enhanced control plane update 90(1), along with the associated timestamp information (e.g., time and date) is then stored into the endpoint tracking database 50.

FIG. 3A illustrates an example in which the endpoint 85 is initially attached to the network fabric 15 (i.e., an endpoint new learn event). As such, since the endpoint 85 has no associated history in the endpoint tracking database 50, a new endpoint tracking list 82 is created for the endpoint. From a network point of view, an endpoint is a unique forwarding address, such as a MAC, IPv4, IPv6, etc., address. As such, an endpoint tracking list may be created for each unique forwarding addresses connected to the network fabric 15. Initially, the endpoint tracking list 82 has a single location entry 84 for the endpoint 85 that corresponds to the initial connection of the endpoint 85 to the network fabric 15. As described further below, the endpoint tracking list 82 grows (i.e., additional location entries are added to the list) as the endpoint 85 undergoes state changes with respect to the network fabric 15 (i.e., changes in how the endpoint 85 is attached to the network).

In FIG. 3A, location entry 84 includes a date field 71, a timestamp field 72, a MAC field 73, an IP field 74, a VLAN field 75, an L2 VNI field 76, an L3 VNI field 78, an interface or port field 79, and a first hop field 80, each of which has been described above with reference to FIG. 1. As shown, in the example of FIG. 3A, endpoint 85 has a MAC address of "MAC_A," an IP address of "IP_A," an associated VLAN of "VLAN 10," an L2 VNI of "3000," an L3 VNI of "5000," an interface of "Eth 1/1" (i.e., the port at which the switch 20(1) communicates with the virtual endpoint 85 via server 30(1)), and a first hop of "Leaf 1," which corresponds to switch 20(1).

Referring next to FIG. 3B, endpoint 85 undergoes a migration (move) from server 30(1) to server 30(3). This migration is a state change that triggers the generation of another enhanced control plane update, which is represented in FIG. 3B by arrows 90(2). As shown, the enhanced control plane update 90(2) is sent to the spine switch 25 and to the other leaf switches 20(1) and 20(2) so that the network fabric has updated forwarding information for the virtual endpoint 85. Also as shown in FIG. 3B, the control plane process 60 forwards the enhanced control plane update 90(2) to network controller 40, namely to the monitoring client 55.

As noted above, the monitoring client 55 is configured to collect the enhanced control plane update 90(2), extract the information included therein, and to store all the available information in the endpoint tracking database 50. Since FIG. 3B illustrates a migration-induced state change for the endpoint 85, the endpoint 85 has prior history in the endpoint tracking database 50, namely location entry 84 forming part of the endpoint tracking list 82. As such, the information extracted from enhanced control plane update 90(2) is used to create a new location entry 86 in the endpoint tracking list 82. Similar to location entry 84, the location entry 86 includes a date field 71, a timestamp field 72, a MAC field 73, an IP field 74, a VLAN field 75, an L2 VNI field 76, an L3 VNI field 78, an interface or port field 79, and a first hop field 80. The MAC address, IP address, L2 VNI, and L3 VNI associated with endpoint 85 remain the same after the migration. However, the endpoint 85 has a new associated VLAN (i.e., "VLAN 20"), a new interface (i.e., a port of "Eth 5/12"), and a new first hop (i.e., "Leaf 3"), corresponding to switch 20(3).

Referring next to FIG. 3C, endpoint 85 undergoes another migration, this time from server 30(3) to server 30(2). Again, this migration is a state change that triggers the generation of another enhanced control plane update, which is represented in FIG. 3C by arrows 90(3). As shown, the enhanced control plane update 90(3) is sent to the spine switch 25 and to the other leaf switches 20(1) and 20(3) so that the network fabric has updated forwarding information for the virtual endpoint 85. Also as shown in FIG. 3C, the control plane process 60 forwards the enhanced control plane update 90(3) to network controller 40, namely to the monitoring client 55.

As noted above, the monitoring client 55 is configured to collect the enhanced control plane update 90(3), extract the information included therein, and to store all the available information in the endpoint tracking database 50. Since FIG. 3C illustrates a migration-induced state change for the endpoint 85, the endpoint 85 has prior history in the endpoint tracking database 50, namely location entries 84 and 86 forming part of the endpoint tracking list 82. As such, the information extracted from enhanced control plane update 90(3) is used to create a new location entry 88 in the endpoint tracking list 82. Similar to location entries 84 and 86, the location entry 88 includes a date field 71, a timestamp field 72, a MAC field 73, an IP field 74, a VLAN field 75, an L2 VNI field 76, an L3 VNI field 78, an interface or port field 79, and a first hop field 80. The MAC address, IP address, L2 VNI, and L3 VNI associated with endpoint 85 remain the same after the migration. However, the endpoint 85 has a new associated VLAN (i.e., "VLAN 30"), a new interface (i.e., a port of "Eth 2/12"), and a new first hop (i.e., "Leaf 2"), corresponding to switch 20(2).

As noted, FIGS. 3A-3C illustrate the generation of an endpoint tracking list 82 for endpoint 85 (e.g., for a unique forwarding address). The endpoint tracking list 82, along with tracking lists for any other endpoints attached to network fabric 15, collectively form a scalable database that is indexed by elastic search parameters that enables a user, such a network administrator, to determine real-time and/or historical location for the endpoint 85 and/or any other endpoints. Stated differently, by using control-plane learned data (e.g., EVPN learned data), real-time as well as historical data can be provided at a different granularity over the life of the fabric itself. Since the information is structured and archived, various pieces of useful information are available to a user. As noted above, examples of this structured data include the life of an endpoint since it was first seen in the fabric, migration history of an endpoint, a heat-map for endpoints per switch, tenant, network, etc. at various timescales, and/or other information related to the location of an endpoint.

Figure 4:
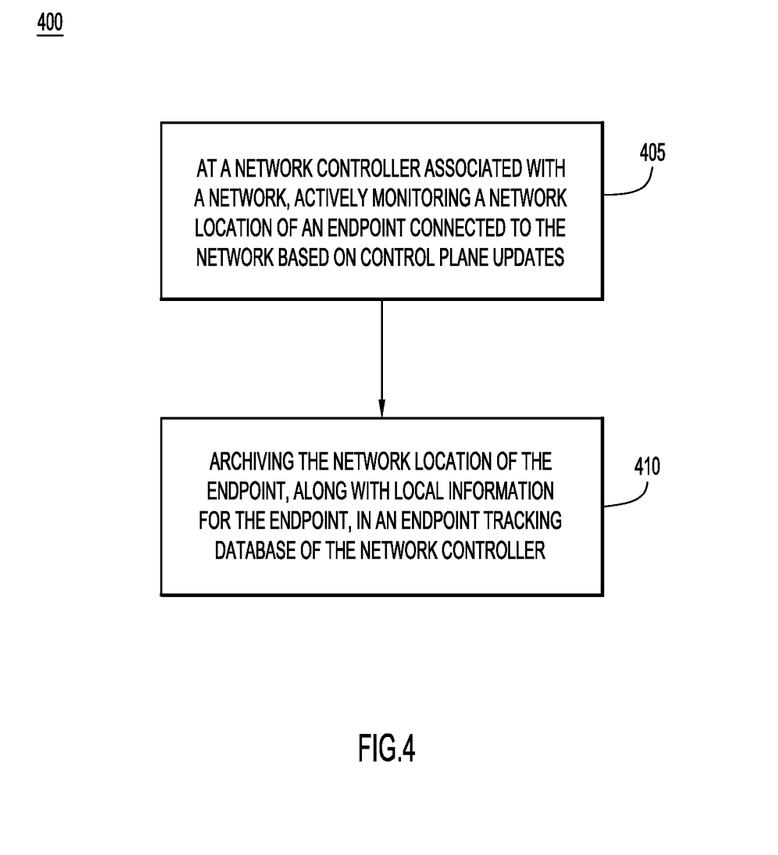
FIG. 4 is a flow chart illustrating a method, according to an example embodiment.

FIG. 4 is a flowchart of a method 400 in accordance with examples presented herein. Method 400 begins at 405 where a network controller associated with a network, actively monitors a network location of an endpoint connected to the network based on control plane updates. At 410, the network location of the endpoint is archived, along with local information for the endpoint, in an endpoint tracking database of the network controller.

In one example, actively monitoring the location of an endpoint in the network based on control plane updates involves receiving, at the network controller, a plurality of control plane updates each propagated in the network as a result of a corresponding state change to the endpoint, and for each of the plurality of control plane updates, extracting information relating to the network location of the endpoint at after the state change. In addition, in these examples, archiving the network location of the endpoint, along with local information for the endpoint, may involve associating timestamp information with the information extracted from each control plane update, and storing the information extracted from each control plane update, along with the associated timestamp information, as an entry in an endpoint tracking list in the endpoint tracking database, wherein entries in the endpoint tracking list are linked based on a forwarding address assigned to the endpoint.

Figure 5:
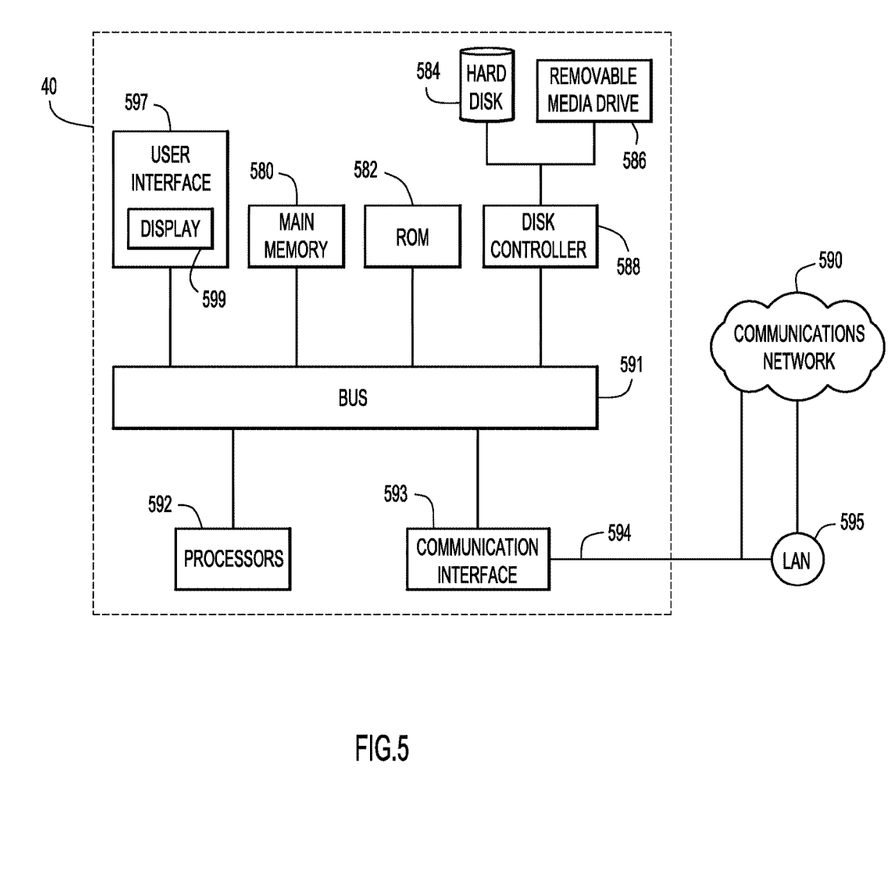
FIG. 5 is a high-level block diagram of a network controller, according to an example embodiment.

FIG. 5 is a block diagram illustrates an arrangement for a network controller 40 upon which aspects presented may be implemented. The network controller 40 includes a bus 591 or other communication mechanism for communicating information, and one or more processors 592 coupled with the bus 591 for processing the information. While FIG. 5 shows a single processor block 592, it should be understood that the processors 592 may represent a plurality of processing cores, each of which can perform separate processing operations. The network controller 40 also includes a main memory 580, such as a random access memory (RAM) or other dynamic storage device (e.g., dynamic RAM (DRAM), static RAM (SRAM), and synchronous DRAM (SD RAM)), coupled to the bus 591 for storing information and instructions to be executed by the one or more processors 592. In addition, the main memory 580 may be used for storing temporary variables or other intermediate information during the execution of instructions by the one or more processors 592.

The network controller 40 includes a read only memory (ROM) 582 or other static storage device (e.g., programmable ROM (PROM), erasable PROM (EPROM), and electrically erasable PROM (EEPROM)) coupled to the bus 591 for storing static information and instructions for the one or more processors 592. Furthermore, the network controller 40 also includes a disk controller 588 coupled to the bus 591 to control one or more storage devices for storing information and instructions, such as a magnetic hard disk 584, and a removable media drive 586. The storage devices may be added to the network controller 40 using an appropriate device interface (e.g., Universal Serial Bus (USB), small computer system interface (SCSI), integrated device electronics (IDE), enhanced-IDE (E-IDE), direct memory access (DMA), or ultra-DMA, etc.).

The network controller 40 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The network controller 40 performs a portion or all of the processing steps of the process in response to the one or more processors 592 executing one or more sequences of one or more instructions contained in a memory, such as the main memory 580. Such instructions may be read into the main memory 580 from another computer readable medium, such as a hard disk 584 or a removable media drive 586. One or more processors in a multi-processing arrangement may also be employed to execute the sequences of instructions contained in main memory 580. In alternative embodiments, hard-wired circuitry may be used in place of or in combination with software instructions. Thus, embodiments are not limited to any specific combination of hardware circuitry and software.

As stated above, the network controller 40 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling operation of the network controller 40, for driving a device or devices for implementing the process, and for enabling the operations associated with monitoring client 55 to generate the endpoint tracking database 50 and for use of the endpoint tracking database 50 to obtain real-time and/or historical location information for an endpoint. Such computer readable storage media further includes a computer program product for performing all or a portion (if processing is distributed) of the processing presented herein. The computer program product may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The network controller 40 also includes a communication interface 593 coupled to the bus 591. The communication or network interface 593 provides a two-way data communication coupling to a network link 594 that is connected to, for example, a local area network (LAN) 595, or to another communications network 590 such as the Internet. For example, the communication interface 593 may be a wired or wireless network interface card to attach to any packet switched (wired or wireless) LAN. As another example, the communication interface 593 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 593 sends and receives electrical, electromagnetic or optical signals that carry digital data streams representing various types of information.

In one form, the network controller 40 includes a user interface 597 that includes a display 599 that may be used to obtain and display endpoint location information based an endpoint tracking database. However, it is to be appreciated that, in alternative embodiments, the endpoint location information may be exported to another device for display and/or subsequent analysis. As noted above, endpoint location information is generally used for network management.

Telemetry in data center fabrics is an important and desired feature. The techniques presented herein provide the ability to determine which endpoints are alive in the network, where the endpoints are currently located (i.e., attached to the network), where the endpoints were previously located, and the current state of the endpoints, all in real-time. To this end, the techniques presented herein include additional local information for an endpoint (e.g., switch port, VLAN) in a control plane update, thereby allowing an endpoint to be tracked at its finest granularity from the network fabric point of view (i.e., to a specific location, including switch and switch port, with related Layer-2 and Layer-3 information). This real-time information is gathered and, when coupled with timestamp information, corresponding to respective control plane updates, historic information can be stored and leveraged for analysis of the endpoint. The techniques presented herein provide a number of advantages including, for example, integrated correlation between endpoint (host) network location and forwarding information in a standalone fabric, such that any change in the endpoint state with respect to the network introduces a trigger event and a real-time update of the endpoint location and local information, thereby providing a single pane solution where all endpoints can be tracked.

It is to be appreciated that the techniques presented herein can be implemented in a number of different arrangements. For example, the techniques presented herein can be extended to a multi-fabric environment that spans across different geographical sites where one can point of the location of end-point within a fabric when there are many interconnected fabrics.

In one form, the techniques presented herein provide a computer-implemented method of, at a network controller associated with a network, actively monitoring a network location of an endpoint connected to the network based on control plane updates. The network controller archives the network location of the endpoint, along with local information for the endpoint, in an endpoint tracking database.

In another form, an apparatus is provided that comprises a network interface unit configured to enable communications over a network, a memory, and at least one processor. The at least one processor is configured to actively monitor a network location of an endpoint connected to the network based on control plane updates. The processor is also configured to archive the network location of the endpoint, along with local information for the endpoint, in an endpoint tracking database stored in the memory.

In still another form, one or more non-transitory computer readable storage media of a network controller are provided. The computer readable storage media is encoded with software comprising computer executable instructions, and when the software is executed, operable to actively monitor a network location of an endpoint connected to a network based on control plane updates and to archive the network location of the endpoint, along with local information for the endpoint, in an endpoint tracking database.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving, at a network controller associated with a network, a plurality of control plane updates propagated in the network as a result of at least one corresponding state change to an endpoint connected to the network, each of the control plane updates comprising local information for the endpoint and information relating to a network location of the endpoint after the at least one corresponding state change;
   at the network controller, actively monitoring the network location of the endpoint connected to the network based on the at least one plurality of control plane updates;
   associating, for each of the control plane updates, timestamp information with the information relating to the network location; and
   storing, for each of the control plane updates, the timestamp information, the local information, and the information relating to the network location as an entry corresponding to the endpoint in an endpoint tracking database.

2. The method of claim 1, further comprising:
   extracting, from each of the control plane updates, the information relating to the network location of the endpoint after the at least one corresponding state change.

3. The method of claim 2, wherein storing, for each of the control plane updates, the timestamp information, the local information, and the information relating to the network location as an entry corresponding to the endpoint in an endpoint tracking database, comprises:
   storing the timestamp information, the local information, and the information relating to the network location as an entry in an endpoint tracking list in the endpoint tracking database, wherein entries in the endpoint tracking list are linked based on a forwarding address assigned to the endpoint.

4. The method of claim 1, wherein the endpoint tracking database is a scalable database that is indexed by elastic search criteria, and wherein the method further comprises:
   receiving, at the network controller, a query for real-time location information of the endpoint.

5. The method of claim 1, wherein the endpoint tracking database is a scalable database that is indexed by elastic search criteria, and wherein the method further comprises:
   receiving, at the network controller, a query for historical location information of the endpoint.

6. The method of claim 1, wherein the local information includes an identification of a physical port of a network device in the network at which the endpoint is connected to the network after the at least one corresponding state change.

7. The method of claim 1, wherein the local information includes an identification of a Virtual Local Area Network (VLAN) associated with the endpoint after the at least one corresponding state change.

8. The method of claim 1, wherein the network location of the endpoint comprises a first-hop network device via which the endpoint is connected to the network.

9. The method of claim 1, further comprising:
   automatically initiating, at the network controller, one or more remedial actions to adjust a configuration of the network based on information in the endpoint tracking database.

10. An apparatus comprising:
    a network interface unit configured to enable communications over a network;
    a memory; and a processor configured to:
receive a plurality of control plane updates propagated in the network as a result of corresponding state change to an endpoint connected to the network, each of the at least one control plane updates comprising local information for the endpoint and information relating to a network location of the endpoint after the at least one corresponding state change;
actively monitor the network location of the endpoint connected to the network based on the plurality of control plane updates;
associate, for each of the control plane updates, timestamp information with the information relating to the network location; and
store, for each of the control plane updates, the timestamp information, the local information, and the information relating to the network location as an entry corresponding to the endpoint in an endpoint tracking database.

11. The apparatus of claim 10, wherein, the processor is further configured to:
extract, from each of the control plane updates, the information relating to the network location of the endpoint after the at least one corresponding state change.

12. The apparatus of claim 11, wherein to store, for each of the control plane updates, the timestamp information, the local information, and the information relating to the network location as an entry corresponding to the endpoint in an endpoint tracking database, the processor is configured to:
store the timestamp information, the local information, and the information relating to the network location as an entry in an endpoint tracking list in the endpoint tracking database, wherein entries in the endpoint tracking list are linked based on a forwarding address assigned to the endpoint.

13. The apparatus of claim 10, wherein the processor is configured to:
automatically initiate one or more remedial actions to adjust a configuration of the network based on information in the endpoint tracking database.

14. The apparatus of claim 10, wherein the local information includes an identification of a physical port of a network device in the network at which the endpoint is connected to the network after the at least one corresponding state change.

15. The apparatus of claim 10, wherein the network location of the endpoint comprises a first-hop network device via which the endpoint is connected to the network.

16. One or more non-transitory computer readable storage media of a network controller, the computer readable storage media being encoded with software comprising computer executable instructions, and when the software is executed, operable to:
receive a plurality of control plane updates propagated in a network as a result of at least one corresponding state change to an endpoint connected to the network, each of the control plane updates comprising local information for the endpoint and information relating to a network location of the endpoint after the at least one corresponding state change;
actively monitor the network location of the endpoint connected to the network based on the plurality of control plane updates;
associate, for each of the control plane updates, timestamp information with the information relating to the network location; and
store, for each of the control plane updates, the timestamp information, the local information, and the information relating to the network location as an entry corresponding to the endpoint in an endpoint tracking database.

17. The non-transitory computer readable storage media of claim 16, further comprising instructions operable to:
extract, from each of the control plane updates, the information relating to the network location of the endpoint after the at least one corresponding state change.

18. The non-transitory computer readable storage media of claim 17, wherein the instructions operable to store, for each of the control plane updates, the timestamp information, the local information, and the information relating to the network location as an entry corresponding to the endpoint in an endpoint tracking database, comprise instructions operable to:
store the timestamp information, the local information, and the information relating to the network location as an entry in an endpoint tracking list in the endpoint tracking database, wherein entries in the endpoint tracking list are linked based on a forwarding address assigned to the endpoint.

19. The non-transitory computer readable storage media of claim 16, further comprising instructions operable to:
automatically initiate one or more remedial actions to adjust a configuration of the network based on information in the endpoint tracking database.

20. The non-transitory computer readable storage media of claim 16, wherein the local information includes an identification of a physical port of a network device in the network at which the endpoint is connected to the network after the at least one corresponding state change.

* * * * *

UNITED STATES PATENT AND TRADEMARK OFFICE
CERTIFICATE OF CORRECTION

PATENT NO. : 10,298,698 B2  
APPLICATION NO. : 15/205031  
DATED : May 21, 2019  
INVENTOR(S) : Shyam Kapadia et al.

Page 1 of 1

It is certified that error appears in the above-identified patent and that said Letters Patent is hereby corrected as shown below:

In the Claims

Claim 1, Column 12, Line 13, please replace "on the at least one plurality" with --on the plurality--

Claim 10, Column 13, Line 3, please replace "of corresponding" with --of at least one corresponding--
Claim 10, Column 13, Line 5, please replace "the at least one control" with --the control--

Signed and Sealed this  
Twenty-fifth Day of June, 2019

Andrei Iancu  
*Director of the United States Patent and Trademark Office*